United States Patent [19]

Kaiser, Jr. et al.

[11] Patent Number: 5,097,506

[45] Date of Patent: Mar. 17, 1992

[54] KEYBOARD PASSWORD LOCK

[75] Inventors: Roger A. Kaiser, Jr.; James H. Nuckols, both of Houston, Tex.

[73] Assignee: Compaq Computer Corporation, Houston, Tex.

[21] Appl. No.: 525,490

[22] Filed: May 18, 1990

[51] Int. Cl.[5] .................... H04L 9/32; G06F 13/14
[52] U.S. Cl. ............................ 380/25; 380/4; 380/23; 380/49; 340/825.31; 340/825.34
[58] Field of Search ............ 380/4, 25, 23, 49, 50; 364/286.5, 234, 469.4, 428, 200, 900, 234, 286.5, 928, 969.4; 340/825.31, 825.34

[56] References Cited

U.S. PATENT DOCUMENTS

| | | | |
|---|---|---|---|
| 4,523,271 | 6/1985 | Levien | 364/200 |
| 4,740,890 | 4/1988 | William | 380/4 |
| 4,942,606 | 7/1990 | Kaiser et al. | 380/4 |
| 4,951,249 | 8/1990 | McClung et al. | 364/900 |
| 4,959,860 | 9/1990 | Watters et al. | 380/4 |

OTHER PUBLICATIONS

Televideo 950 ... User's Guide (4/82) pp. 2-5, 4-4 4-5.

Primary Examiner—Bernaar E. Gregory
Attorney, Agent, or Firm—Pravel, Gambrell, Hewitt, Kimball & Krieger

[57] ABSTRACT

A keyboard controller or interface with scans entered key sequences for a key sequence activating a keyboard lock feature. A password and particular hot key are loaded by the system microprocessor. The keyboard interface then scans untl the designated sequence is activated. All keyboard activity is blocked from the system microprocessor until a password sequence is entered. Codes releasing some of the key strokes in the activation sequence are transmitted and normal operation, including activation sequence scanning, resumes. The password mode may be directly activated on command from the system microprocessor.

11 Claims, 4 Drawing Sheets

KEYBOARD PASSWORD LOCK

BACKGROUND OF THE INVENTION

1. Field of the Invention

The invention generally relates to keyboards used with computer systems and more particularly to a method and apparatus for locking access to the computer through the keyboard until a password is entered.

2. Description of the Related Art

Personal computer systems are becoming more elaborate and are being used for more critical functions. For example, originally personal computers were only used for very simple word processing tasks and spreadsheet applications of relatively limited complexity. Today however, personal computers are being used to form elaborate network systems, both as the work stations and as the file servers and applications of great sensitivity or complexity are being executed. As the complexity of the various applications has gone up dramatically from a simple small spreadsheet application to horribly complex spreadsheets, so has the time required to perform the calculations. In many cases it is convenient for the user to do other tasks and leave his office, leaving the computer unattended. This unattended state is quite common in file server applications of the computer.

Security in the personal computer either locally or on to a network is always of concern. For instance, if an administrator's station is connected into a network, the administrator will have various rights which other users are not allowed. If an ordinary user were to gain access to the network via the administrator's station and begin performing privileged options, disastrous results could occur in the network system. The same is true of access to the file server itself. Alternatively, if a spreadsheet program is in the midst of performing a very long recalculation and the operator wishes to leave for a period of time, another party could come in and see the computer doing apparently nothing and hit a key on the keyboard. This could result in the long recalculation being terminated midstream and having to be restarted. For these reasons it is desireable to be able to lock the keyboard so that access cannot be obtained without some clearance.

In personal computers according to the International Business Machines (IBM) PC/AT class, a physical key switch was used to disable the keyboard activity. If the key switch was in the unlocked position, the keyboard characters were transmitted to the computer system, while when the key switch was in a locked position the characters were not transmitted to the computer system. One advantage of this was that it was very easy to allow keyboard security to be developed in that the key switch merely had to be turned to the locked position, but a disadvantage was that the key switch had to be readily accessible. If for instance the unit was located in a remote location, on the floor or had a very small size so that the key switch had to be located other than on the front of the unit, this need to physically access the key switch became inconvenient. One large advantage of the key switch was that it required no intervention by the processor in the computer system to perform the locking function and thus long tasks could be left running without interference.

When IBM introduced the PS/2 series of personal computers a software based password feature was included. The password value could be loaded into the keyboard interface and activated by software in the computer system so that the keyboard interface did not transfer characters to the system until the password was entered. This was typically done to prevent data entry to the computer system upon initial turn-on, but this feature could be enabled at a later time by means of a utility program. However, because a separate program was needed, this program could not be initiated while other programs had control of the system, such as a spreadsheet program during recalculation. While it was possible to do a hot key scanning sequence using the system processor, a drawback to this technique was that certain operating systems blocked access to the keyboard interface and therefore the password mode could not be initiated.

SUMMARY OF THE INVENTION

In a computer system according to the present invention the keyboard password capability can be activated without interference to any other programs which are operating in the computer system. The password and a key to complete a hot key sequence is downloaded into the keyboard interface, which is continually scanning the input sequence of key codes received from the keyboard. If a particular sequence of key codes, in the preferred embodiment, the CRTL, ALT and L make codes, are simultaneously present, this is an indication to the keyboard interface that password protected or active mode should be activated. The keyboard interface on its own then proceeds to block all incoming key codes until the complete password is entered. The keyboard interface then scans the received codes to see if the password is being entered. If the password is not entered, the scanning continues. If the password is entered, the password protected or active mode is exited. After the password active mode has been exited, the keyboard interface sends break codes for the CTRL and ALT keys to indicate to the running program that those keys have been released. Thus in this way the main processor in the computer system does not have to perform any function other than initially enabling the keyboard password sequence in the keyboard interface during the initial phases of operation of the computer system. The keyboard controller then performs all scanning functions without assistance from the central processor, which can thus be performing other duties, such as spreadsheet recalculation or file server functions.

BRIEF DESCRIPTION OF THE DRAWINGS

A better understanding of the present invention can be obtained with the following detailed description of the preferred embodiment is considered in conjunction with the following drawings, in which.

DETAILED DESCRIPTION OF THE PREFERRED EMBODIMENT

Figure 1:
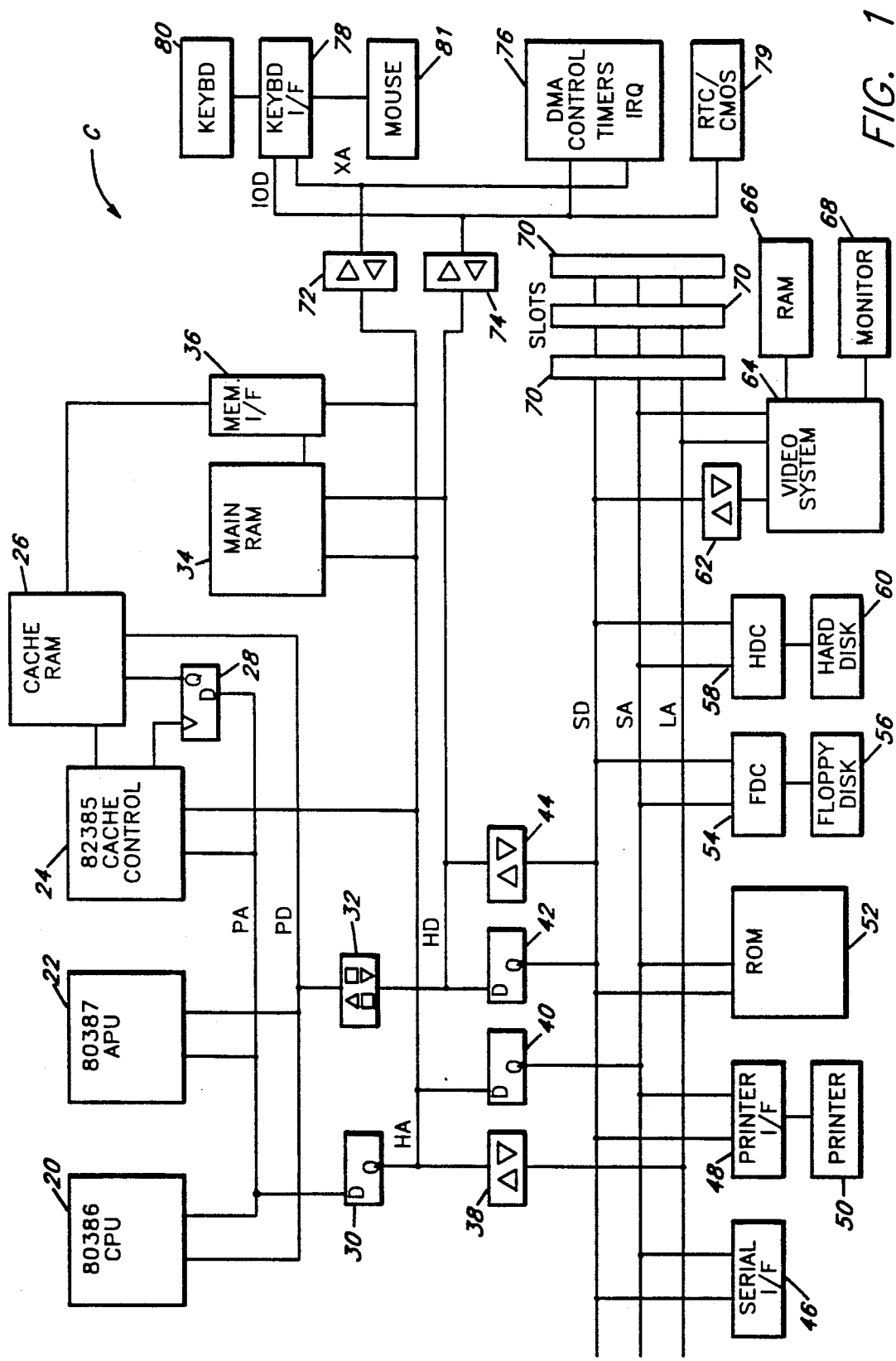
FIG. 1 is a block diagram of a computer incorporating the present invention.

Referring now to FIG. 1, the letter C generally represents a computer incorporating the present invention. A number of different blocks are used in the computer C. This description of the computer C is provided to be exemplary of the environment of the invention and is not intended to be limiting as to the particular arrangement of the illustrated computer C. The microprocessor 20 used is preferably an 80386 microprocessor manufactured by Intel Corporation (Intel). The microprocessor 20 has an address bus PA and a data bus PD, these buses PA and PD being referred to as the local buses. Coupled to the local bus are an arithmetic processing unit or numerical coprocessor 22, preferably an 80387 manufactured by Intel; a cache controller 24, preferably an 82385 manufactured by Intel or similar; cache RAM 26 and an address latch 28. The cache controller 24 cooperates with the cache RAM 26 to provide the necessary control to handle a cache system in the computer C. The local bus is connected to an intermediate bus by means of a latch 30 which connects the local address bus PA to an intermediate address bus HA. A latched transceiver 32 connects the local data bus PD to an intermediate data bus HD. Connected to the intermediate bus is the main memory 34 in the computer C and a memory interface 36. The memory 34 is thus relatively tightly coupled to the processor 20.

Various other buses are developed from the intermediate bus. For example, intermediate address bus HA is coupled by a transceiver 38 to an early system address bus LA and by a latch 40 to a latched system address bus SA. The intermediate data bus HD is coupled by a latch 42 and a transceiver 44 to the system data bus SD. Numerous devices are coupled to the system buses LA, SA and SD, as are a series of slots 70 which are used for receiving interchangeable circuit boards which contain additional functions which can be utilized in the computer C. A serial interface 46 is connected to the system data bus SD and the latched system address bus SA. a printer interface 48 is also connected to the system data bus SD and the latched system address bus SA, with a printer 50 being attached to the printer interface 48. The read only memory (ROM) 52 which contains the basic operating software of the computer C is connected to the system data bus SD and the latched system address bus SA. A floppy disk controller 54 is connected to the system data bus SD and the latched system address bus SA. A floppy disk unit 56 which is used for providing storage for the computer C is connected to the floppy disk controller 54. Similarly, a hard disk controller 58 is connected to the system data bus SD and the latched system address bus SA, with a hard disk unit 60 being attached to the hard disk controller 58. A video system 64 which controls the presentation of data to the user is connected to the early system address bus LA and the latched system address bus SA, and coupled to the system address data bus SD by means of a transceiver 62. Connected to the video system 64 are the Random Access Memory (RAM) 66 used to form the video memory and a monitor 68 which presents the desired display to the user.

Various other subsystems are coupled to the intermediate data and address buses HD and HA. A transceiver 72 is connected to the intermediate address bus HA and to an extended address bus XA. A transceiver 74 is connected between the intermediate data bus HD and input/output (I/O) data bus IOD. Connected to the extended address bus XA and the data bus IOD, is a combined unit 76 which contains the DMA controller for the computer C, a series of timers and the interrupt controller. A keyboard interface 78 is also connected to the extended address bus XA and the I/O data bus IOD. A keyboard 80 is connected to the keyboard interface 78 to allow the user to enter desired character sequences and commands. A mouse 81 or other compatible pointing device, sometimes referred to as an auxiliary input device, is also connected to the keyboard interface 78. The keyboard interface 78 is preferably an 8042 class of microcontroller or peripheral interface device as commonly used in IBM PC compatible computers. A real time clock (RTC)/CMOS memory 79 is connected to the data bus IOD to provide constant time of day functions and allow storage of various system constants and values related to system configuration and options.

Figure 2A:
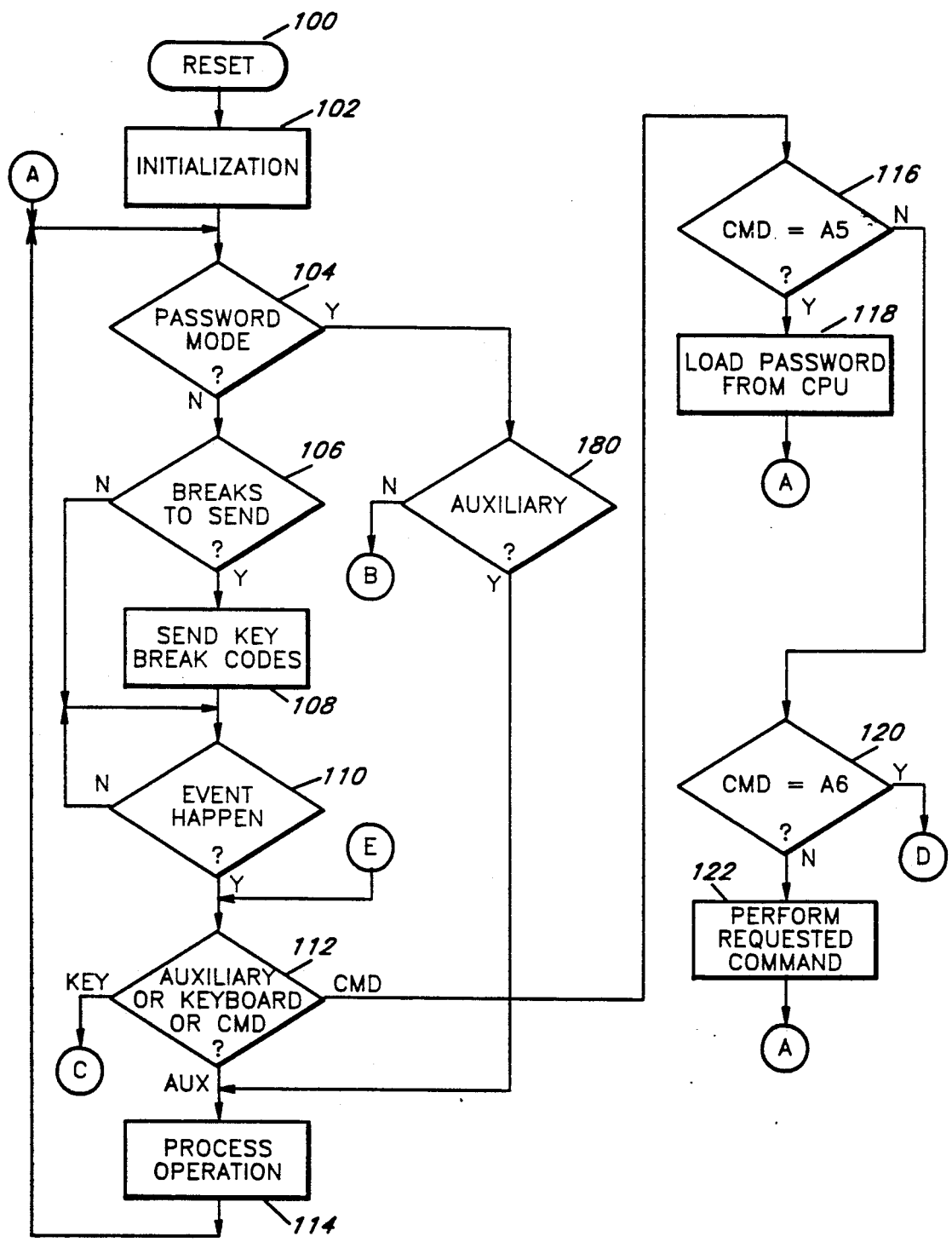
FIGS. 2A, 2B and 2C are flowchart illustrations of operating sequences of the keyboard controller of FIG. 1 according to the present invention.

Proceeding now to the operation of the keyboard interface 78, operation commences at the reset sequence 100 (FIG. 2A) of the keyboard interface 78. Control commences at step 102 where various initialization activities are performed. Example initialization items are clearing of all memory except the password value, setting up the internal time and ports and setting up the various RAM values to be utilized during operation. Control then proceeds to step 104 where the keyboard interface 78 determines whether password protected mode is active. If not, control proceeds to step 106 where a determination is made as to whether any key break characters or codes are to be sent. In personal computers according to the IBM PC and those compatible therewith, every time a key contact is made on the keyboard 80 a make character or code is sent from the keyboard interface 78 to the microprocessor 20 and every time a key is released a break character is sent to the microprocessor 20. This way the microprocessor 20 has the capability of determining at any time which keys are actually depressed and determining the sequencing of the keys. These breaks would be present in step 106 after exiting password active mode because when entering password active mode certain keys have been depressed and passed through to the microprocessor 20 and these keys need to be released. Therefore the operating sequence 100 queues up these breaks when password protected mode is entered for transmission when password protected mode is exited. If there are breaks to send, indicating that this is the first loop after leaving password protected mode, control proceeds to step 108 where the key break codes are transmitted to the processor 20. If there were no breaks to send or the breaks have been sent, control proceeds to step 110 to determine if an event of interest to the keyboard interface 78 has occurred. These events can be either an input from the auxiliary device, commonly the mouse 81; keyboard activity, such as making or breaking of a key, or a command being received from the microprocessor 20. If an event has not occurred, control loops 110, back to step so that operation stays on step 110 until an event does occur. If an event has occurred, control proceeds to step 112 to determine if it was received from the auxiliary device, the keyboard 80 or is a command from the microprocessor 20. If it is an auxiliary input from the mouse 81, control proceeds to step 114 where the operation requested is performed. Control then proceeds to step 104 to form a loop.

If a command was received from the microprocessor 20, control proceeds from step 112 to step 116 where an evaluation is made if the command was as A5 command. If so, control proceeds to step 118 where the password is loaded. In this way the microprocessor 20 can load up the memory in the keyboard interface 78 with the password which has been stored in the CMOS 79 or has just been entered by the user using a utility program. Control proceeds from step 118 to step 104.

If the command was not an A5 command, control proceeds from step 116 to step 120, where a determination is made whether the command is an A6 command. The A6 command is a command for the keyboard interface 78 to directly enter password active mode. If the command is not an A6 command, control proceeds to step 122 where the requested command is performed. One of these commands allows the microprocessor 20 to transfer a value directly to a location in the keyboard interface 78. By this method the microprocessor 78 can provide the final key, the character key, in the password protection activation sequence. There are numerous other commands which can be performed but they are generally known and are ancillary to the present invention and therefore not described in detail. After performing the requested command, control proceeds to step 104. If the command was determined in step 120 to be an A6 command, control proceeds to step 124 (FIG. 2C).

Figure 2B:
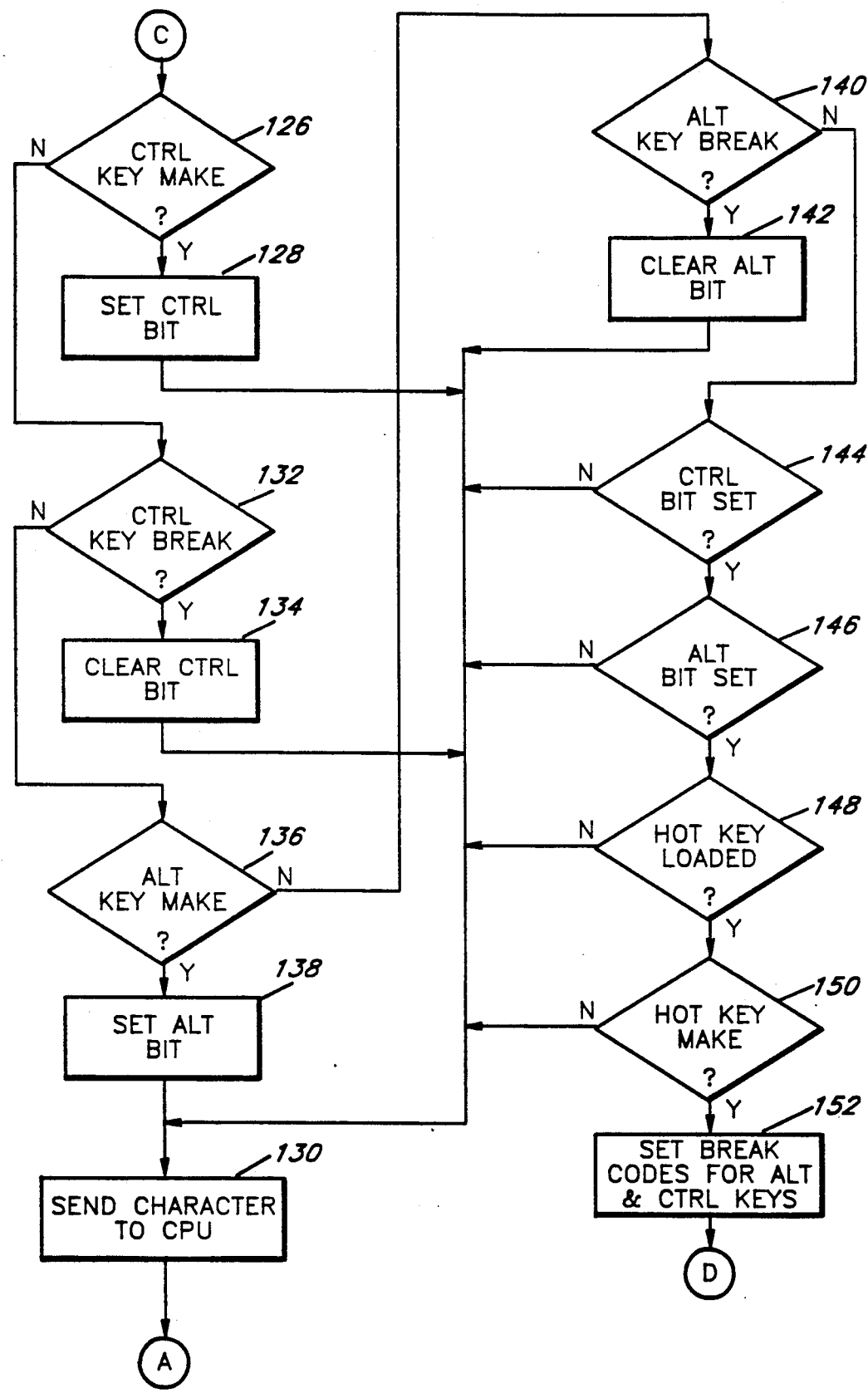
Figure 2C:
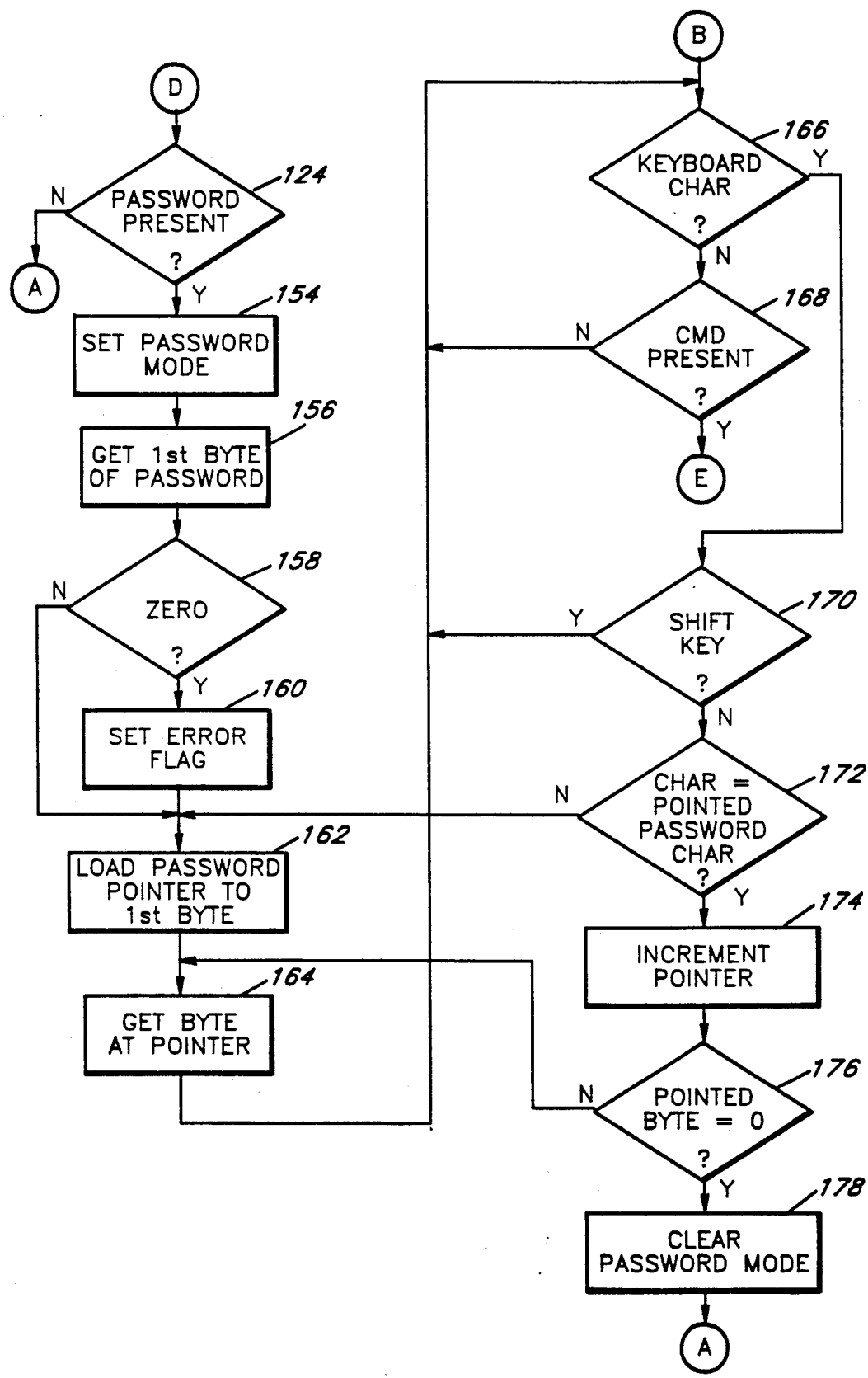

If in step 112 it was determined that keyboard activity was the basis for leaving step 110, control proceeds to step 126 (FIG. 2B). The keyboard interface 78 determines whether the event that occurred was the making of a CTRL or control key. If so, control proceeds to step 128 where a control key depressed bit is set in the keyboard interface 78. This bit is used to keep track of the various depressions of one of the keys required to establish the password activation sequence. Control proceeds from step 128 to step 130 where the character, in this case the control make key code, is transmitted to the microprocessor 20. Control then proceeds to step 104.

If in step 126 it was determined that a CTRL key was not made, control proceeds to step 132 where a determination is made if a CTRL key break code was received. If so, control proceeds to step 134 where the CTRL key depressed bit is cleared and control proceeds to step 130. If the CTRL key break character was not received in step 132, control proceeds to step 136 where a determination is made if an ALT key has been made. If so, the ALT key depressed bit is set in step 138 and control proceeds to step 130 to transmit the make character code to the microprocessor 20.

If an ALT key was not made as determined in step 136, control proceeds to step 140 where the keyboard interface 78 determines whether the received character was an ALT key break code. If so, control proceeds to step 142 where the ALT key depressed bit is cleared and then control proceeds to step 130. If the ALT key break code was not received in step 140, control proceeds to step 144 to determine if the CTRL key depressed bit is set. If not, control proceeds to step 130. If so, control proceeds to step 146 where the keyboard interface 78 determines if the ALT key depressed bit is set. If not, control proceeds to step 130, while if it is set control proceeds to step 148. In step 148 the keyboard interface 78 determines if the hot key is loaded. The hot key is considered the third key in this sequence of CTRL, ALT and a character which is used to initialize entry into the password active or lock mode purely from the keyboard. The hot key may have a certain default value, preferably stored in the CMOS 79 and provided at power up by the microprocessor 20 in addition to the password, but which can be provided or changed by a utility program. The preferred hot key is the L, but other keys can be used if desired. If the hot key has not been loaded into the keyboard interface 78, this is an indication that the hot key password protected activity is not desired and thus the sequence is aborted. Therefore if the hot key is not loaded into the keyboard interface 78, control proceeds to step 130.

If the hot key is loaded, control proceeds from step 148 to step 150 where a determination is made if the hot key make code has been received. If not, control proceeds to step 130. If so, this is an indication that the CTRL, ALT and hot keys are all simultaneously depressed, the indication that password protected mode is to be entered. Control thus proceeds to step 152 where the break codes are set for the ALT and CTRL keys. This is necessary because the ALT and CTRL key make codes have been transmitted to the microprocessor 20 in step 130 as those keys were depressed and therefore an indication of the release of these keys must be sent when key code transmission to the microprocessor 20 is resumed after exiting password protected mode because the keys will have been released to enter the password, but the release will have been completed prior to resuming transmission and so the release key codes will not have been sent to the microprocessor 20, but it is still necessary to indicate release of the keys. Therefore the break codes are loaded up for transmission in step 108. The break code for the hot key is not needed because that key make code has not been transmitted to the microprocessor 20 and therefore does not have to be undone.

Control then proceeds from step 152 to step 124 where a determination is made as to whether a password is present in the keyboard interface 78. If not, this is yet another indication that the feature is not enabled and therefore control proceeds to step 104. If a password is present, control proceeds to step 154 where the password protected mode is set. Control proceeds to step 156 to obtain the first byte of the password. In step 158, the next step, a determination is made as to whether the first byte of the password is 0. If so, this an error condition and an error flag is set 160. If not, control proceeds to step 162, which is also were control proceeds from step 160, where a pointer to the first byte of the password stored in the keyboard interface 78 is loaded into a register in the keyboard interface 78 for addressing purposes. Control then proceeds to step 164 where the password byte at the pointer value is obtained for comparison purposes. Control then proceeds to step 166 to determine if a keyboard character make code has been received from the keyboard 80. If not, control proceeds to step 168 to determine if a command has been received from the microprocessor 20. If not, control returns to step 168, thus forming a scanning loop between looking for keyboard characters and microprocessor commands. If a command is present, control proceeds from step 168 to step 112 for command processing.

If in step 166 it is determined that a keyboard character was depressed, control proceeds to step 170 to determine if it was shift key that was depressed. If so, control proceeds to step 166 in as much as shift keys are ignored in the password process. If it was not a shift key, control proceeds to step 172 where a determination is made as to whether the keyboard character received is equal to the password character at the pointed location. If not, control returns to step 162 wherein the password pointer is reloaded to the first byte so that scanning then recommences at the beginning of the password. If the character is equal to the pointed password character, control proceeds to step 174, where the pointer value is incremented to point to the next character in the password. In step 176 a determination is made as to whether the pointed byte has a value of 0. If so, this is an indication that the entire password has been scanned and thus received from the keyboard 80. If the pointed byte is not equal to 0, control proceeds to step 164 to continue scanning for the next password character. If the pointed byte is 0, control proceeds to step 178 where the password protected mode is cleared so that keyboard processing and transmission to the microprocessor 20 can commence and the break codes will be sent in step 108. Control then proceeds to step 104.

If in step 104 it was determined that password mode was active, control proceeds to step 180 where a determination is made as to whether an input was received from the auxiliary device. If so, control proceeds to step 114 and this operation is processed. If not, control proceeds to step 166 to determine if a keyboard character had been depressed, thus entering a sequence of looking for the password to enable keyboard activity.

Thus it can be seen that when a predetermined keyboard sequence is developed, in the preferred embodiment the simultaneous depression of the CTRL, ALT and a particular hot key, the keyboard interface 78 stops transmitting characters to the microprocessor 20 without any intervention whatsoever from the microprocessor 20. The microprocessor 20 has only to perform the initial enabling of the feature by setting the password and hot key values and then the operations are performed solely in the keyboard interface 78. It is noted that the password and hot key values can either be present in the CMOS 79 and loaded when the computer C is performing its power-on self-test or initialization operations or can be loaded by a utility program running on the computer C, which then terminates leaving the keyboard interface 78 awaiting the hot key sequence to enter password protected mode. Thus a program on the computer C need not be active to enable password protected mode and this allows alternate programs which need the microprocessor 20 to be performed.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An apparatus for password locking a keyboard in a computer system having a bus for transferring information; a microprocessor coupled to said bus for receiving and transmitting information and controlling various operations of the computer system; and a keyboard for receiving data entry and producing signals representative of key operations, the apparatus comprising:

a keyboard interface means coupled to said bus and said keyboard for providing said key operations to said microprocessor over said bus, said keyboard interface means including:

means for storing a password and for storing a key operation sequence for entering a password protected mode;

means for scanning the key operations sequence to determine if said password protected mode entry sequence has been performed and for providing key operations to said microprocessor;

means coupled to said password protected mode entry sequence scanning means for entering password protected mode after determining performance of said password protected mode entry sequence and ceasing providing key operations to said microprocessor during said password protected mode;

means for scanning the key operation sequence after entry into password protected mode for entry of a key operations sequence matching said password; and means coupled to said password entry sequence scanning means for exiting said password protected mode after said password key operation sequence has been determined and resuming providing of key operations to said microprocessor.

2. The apparatus of claim 1, further comprising:

nonvolatile memory means coupled to said bus and accessible by said microprocessor for storing said password and portions of said password protected mode entry sequence and wherein said microprocessor includes means for reading said stored values from said nonvolatile memory and providing said stored values to said keyboard interface means for storage in said keyboard interface means.

3. The apparatus of claim 1, wherein said keyboard interface means further includes:

means for receiving commands from said microprocessor; and means for interpreting one of said commands to activate entry into said password protected mode.

4. The apparatus of claim 1, wherein said keyboard interface means further includes:

means for providing key operations sequence information indicating the withdrawal of certain of said key operations after exiting password protected mode and prior to resuming providing key operations to said microprocessor.

5. The apparatus of claim 1, wherein said key operations sequence for entering password protected mode includes simultaneously having depressed a plurality of keys on said keyboard.

6. The apparatus of claim 5, wherein three keys must be simultaneously depressed.

7. The apparatus of claim 6, wherein said three keys are a control key, an alternate key and a character key.

8. The apparatus of claim 1, wherein said keyboard interface means further includes:

means for overriding entry into password protected mode if a password or a portion of said password protected mode entry key sequence has not been stored in said password storing means.

9. A method for password locking a keyboard in a computer system having a microprocessor for controlling operations and receiving key operations, a keyboard on which to perform key operations, and a keyboard interface coupled to the microprocessor and the keyboard for receiving key operations from the keyboard and providing them to the microprocessor and for receiving commands form the microprocessor; the method comprising:

scanning the key operations sequence until a predetermined sequence is entered and providing key operations to the microprocessor during said scanning;

entering password protected mode after determining entry of the predetermined sequence and ceasing providing key operations to the microprocessor;

scanning the key operations sequence during password protected mode for a password sequence;

exiting said password protected mode after determining entry of said password sequence and resuming providing key operations to the microprocessor.

10. The method of claim 9, further comprising:
entering said password protected mode upon receipt of a command from the microprocessor.

11. The method of claim 9, further comprising:
providing key operations sequence information of withdrawal of certain of the key operations in said predetermined sequence after exiting password protected mode and prior to resuming key operation provision to the microprocessor.

* * * * *

UNITED STATES PATENT AND TRADEMARK OFFICE
CERTIFICATE OF CORRECTION

PATENT NO. : 5,097,506
DATED : March 17, 1992
INVENTOR(S) : Roger A. Kaiser, Jr., et al.

It is certified that error appears in the above-identified patent and that said Letters Patent is hereby corrected as shown below:

Column 8, line 60, please delete "form" and replace with --from--.

Signed and Sealed this

Fifteenth Day of June, 1993

Attest:

MICHAEL K. KIRK

Attesting Officer

Acting Commissioner of Patents and Trademarks